United States Patent [19]

Takata et al.

[11] Patent Number: 4,945,021

[45] Date of Patent: Jul. 31, 1990

[54] PHOTOSENSITIVE MEMBER COMPRISING BISAZO PIGMENT

[75] Inventors: Masakazu Takata; Takamasa Ueda; Kimiyuki Ito, all of Osaka; Yuko Mikasa, Nishinomiya; Yuki Shimada; Tsuneaki Hirashima, both of Osaka; Souichi Yamamoto, Himezi; Yoshio Ishino, Kyoto; Toshinobu Ohno, Osaka, all of Japan

[73] Assignees: Minolta Camera Kabushiki Kaisha; Osaka Municipal Government, both of Osaka, Japan

[21] Appl. No.: 308,629

[22] Filed: Feb. 10, 1989

[30] Foreign Application Priority Data

Feb. 16, 1988 [JP] Japan ................................. 63-34593
May 25, 1988 [JP] Japan ................................. 63-127495
Jul. 7, 1988 [JP] Japan ................................. 63-169379
Oct. 27, 1988 [JP] Japan ................................. 63-271899

[51] Int. Cl.⁵ ............................................. G03G 5/06
[52] U.S. Cl. ..................................... 430/76; 430/58; 430/78
[58] Field of Search ................ 430/58, 70, 72, 73, 430/74, 75, 76, 78

[56] References Cited

U.S. PATENT DOCUMENTS

| | | | |
|---|---|---|---|
| 4,032,339 | 6/1977 | Grushkin et al. | 430/58 |
| 4,062,854 | 12/1977 | Grushkin | 430/58 |
| 4,123,270 | 10/1978 | Heil et al. | 430/78 |
| 4,272,598 | 6/1981 | Sasaki et al. | 430/72 |
| 4,396,695 | 8/1983 | Dimmler et al. | 430/59 |
| 4,396,696 | 8/1983 | Nagasaka et al. | 430/78 |
| 4,399,206 | 8/1983 | Katagiri et al. | 430/58 |
| 4,419,428 | 12/1983 | Katagiri et al. | 430/77 |
| 4,426,432 | 1/1984 | Sawada et al. | 430/58 |
| 4,515,881 | 5/1985 | Sawada et al. | 430/58 |
| 4,533,613 | 8/1985 | Kawamura et al. | 430/72 |
| 4,537,847 | 8/1985 | Takahashi et al. | 430/58 |
| 4,540,651 | 9/1985 | Fujimaki et al. | 430/72 |
| 4,554,231 | 11/1985 | Ishikawa et al. | 430/59 |
| 4,582,771 | 4/1986 | Ohta | 430/58 |
| 4,631,242 | 12/1986 | Emoto et al. | 430/59 |
| 4,647,520 | 3/1987 | Watanabe et al. | 430/58 |
| 4,663,442 | 5/1987 | Ohta | 534/759 |
| 4,672,149 | 6/1987 | Yoshikawa et al. | 136/263 |
| 4,687,721 | 8/1987 | Emoto et al. | 430/58 |
| 4,702,982 | 10/1987 | Matsumoto et al. | 430/72 |
| 4,716,220 | 12/1987 | Tsutsui | 534/738 |
| 4,743,523 | 5/1988 | Yamashita et al. | 430/59 |
| 4,760,003 | 7/1988 | Matsumoto et al. | 430/58 |
| 4,820,600 | 4/1989 | Akasaki et al. | 430/58 |

FOREIGN PATENT DOCUMENTS 54-22834 2/1979 Japan .
55-117151 9/1980 Japan .
59-214034 12/1984 Japan .
60-19152 1/1985 Japan .
60-121451 6/1985 Japan .
61-272755 12/1986 Japan .
62-55662 11/1987 Japan .
62-55786 11/1987 Japan .
62-58505 12/1987 Japan .
62-59299 12/1987 Japan .

Primary Examiner—John L. Goodrow
Attorney, Agent, or Firm—Burns, Doane, Swecker & Mathis

[57] ABSTRACT

The present invention relates to a photosensitive member containing a specific bisazo compound described by general structural formula[I] and formed on an electrically conductive substrate;

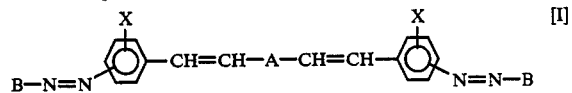

Wherein X is a hydrogen atom, halogen atom, alkyl radical, alkoxi radical, nitro radical or cyano radical; A is a diatomic radical selected from among the following:

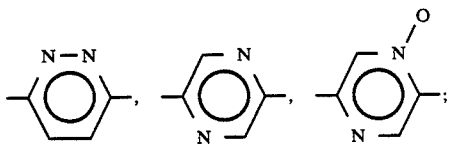

B is a coupler described by formulae [II] through [VI];

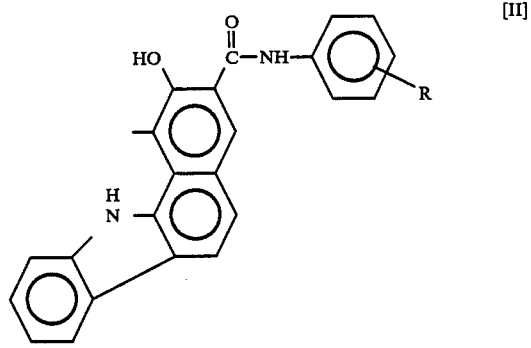

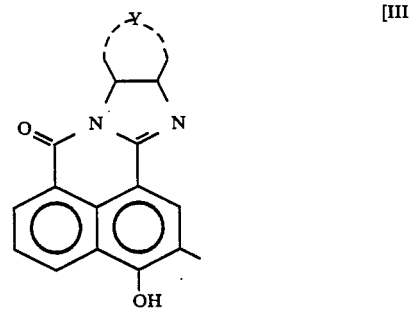

(Abstract continued on next page.)

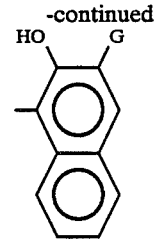 [V]

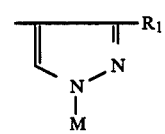 [VI]

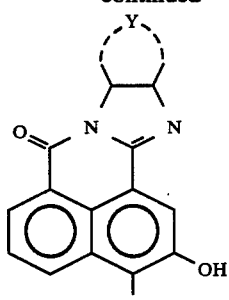 [IV]

R is a hydrogen atom, halogen atom, alkyl radical, alkoxi radical, nitro radical or cyano radical; and Y is an aromatic carbocyclic residue or aromatic heterocyclic residue, each of which may have a substituent; G is a carbamoyl radical or sulfamoyl radical and may have a substituent; $R_1$ is a hydrogen atom, alkyl radical, amino radical or carbamoyl radical, each of which may have a substituent, a carboxyl radical or cyano radical; M is an aryl group which may have a substituent, which is improved in photosensitivity and dispersibility.

12 Claims, No Drawings

PHOTOSENSITIVE MEMBER COMPRISING BISAZO PIGMENT

BACKGROUND OF THE INVENTION

The present invention relates to a photosensitive member incorporating a new bisazo pigment in a photoelectric charge generating layer.

Photosensitive members formed by incorporating an organic charge generating material in a resin bonding agent and coating a conductive substrate with said compound are widely used due to their low toxicity, ease of manufacture and low cost.

Typical organic charge generating materials are phthalocyanine, TNF, PVK, perylene derivatives and the like, and these materials are used together with suitable charge transporting compounds, for example hydrazones, oxadiazoles and the like.

In recent years techniques have been devised for using each type of azo pigment as charge generating materials. However, the number of materials that are useful as charge generating substances in electrophotographic processes and which have excellent photosensitivity, spectral sensitivity and stability of charging potential during repeated use are extremely limited.

Further, in conventional photosensitive member manufacturing processes, the dispersion stability of the fluid dispersion of pigment used to coat the charge generating layer is particularly poor, and severe problems arise due to the deleterious effects on pot-life and film properties. These deleterious effects are one cause of deterioration of spectral sensitivity, spectral sensitivity, and other photosensitive characteristics.

SUMMARY OF THE INVENTION

An object of the present invention is to solve the aforesaid disadvantages by providing a photosensitive member having improved chargeability particularly during repeated use.

A further object of the present invention is to provide a new bisazo pigment as a charge generating material for use in organic photosensitive members having excellent dispersion fluid stability, photosensitivity and spectral sensitivity.

The present invention relates to a photosensitive member comprising a photoconductive layer incorporating a bisazo compound described by general structural formula [I] formed on a conductive substrate;

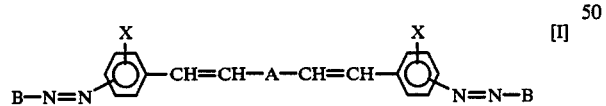

[I]

Wherein X is a hydrogen atom, halogen atom, alkyl radical, alkoxi radical, nitro radical or cyano radical; A is a diatomic radical selected from among the following:

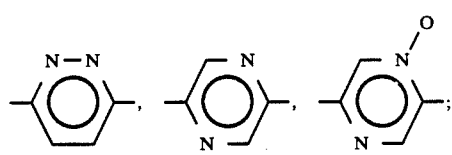

B is a coupler described by formulae [II] through [VI];

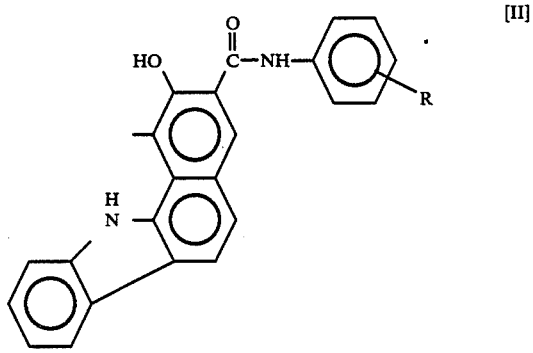

[II]

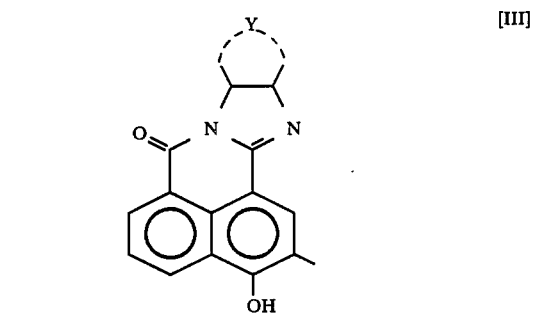

[III]

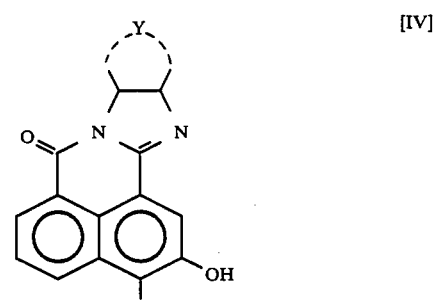

[IV]

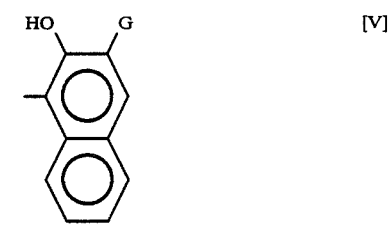

[V]

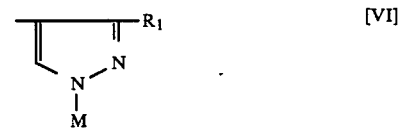

[VI]

R is a hydrogen atom, halogen atom, alkyl radical, alkoxi radical, nitro radical or cyano radical; and Y is an aromatic carbocyclic residue or aromatic heterocyclic residue, each of which may have a substituent; G is a carbamoyl radical or sulfamoyl radical and may have a substituent; R1 is a hydrogen atom, alkyl radical, amino radical or carbamoyl radical, each of which may have a substituent, a carboxyl radical or cyano radical; M is an aryl group which may have a substituent.

DESCRIPTION OF THE PREFERRED EMBODIMENT

The present invention provides a photosensitive member characterized by having a photoconductive layer incorporating a bisazo compound described by general structural formula [I] (below) formed on a conductive substrat;

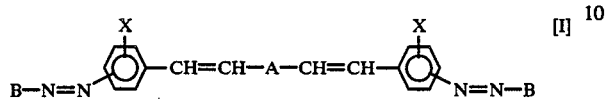
[I]

Wherein X is a hydrogen atom, halogen atom, alkyl radical, alkoxi radical, nitro radical or cyano radical; A is a diatomic radical selected from among the following:

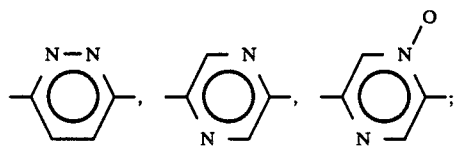

B is a coupler described by formulae [II] through [VI];

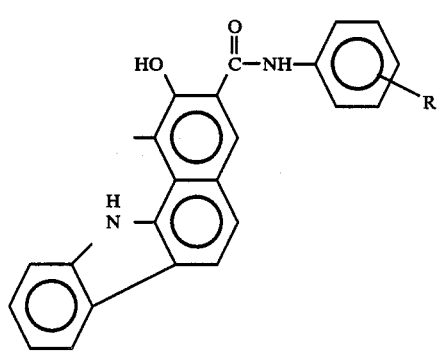
[II]

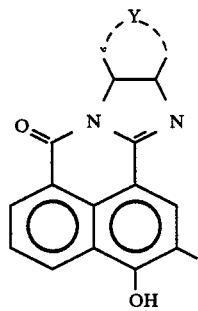
[III]

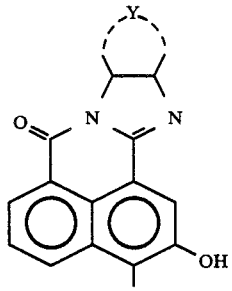
[IV]

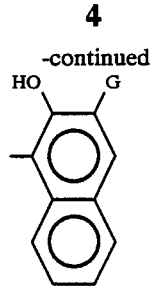
[V]

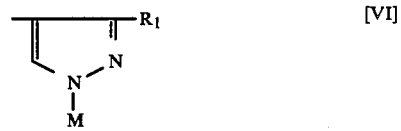
[VI]

R is a hydrogen atom, halogen atom, alkyl radical, alkoxi radical, nitro radical or cyano radical; and Y is an aromatic carbocyclic residue or aromatic heterocyclic residue, each of which may have a substituent; G is a carbamoyl radical or sulfamoyl radical and may have a substituent; R1 is a hydrogen atom, alkyl radical, amino radical or carbamoyl radical, each of which may have a substituent, a carboxyl radical or cyano radical; M is an aryl group which may have a substituent.

The bisazo compound of the invention has excellent photosensitivity and dispersibility in a coating solution.

The bisazo compound expressed by general structural formula [I] can be obtained, for example, reacting a heterocyclic compound selected from among

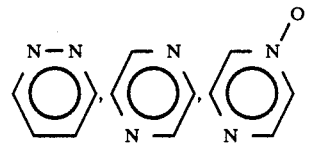

and having two substituted methyl radicals, with p-nitro-benzene aldehyde or o-nitrobenzene aldehyde or substitute thereof, so as to obtain a di-(p-nitrostyryl) heterocyclic aromatic compound. Subsequently, the amino compound obtained by the reduction of the nitro radical is rendered an diazonium salt by a conventional method, for example, by reacting arsenious acid in hydrochloric acid solution. Said diazonium salt is then coupled using a coupling agent described by the structural formulae [II] through [VI]. A preferred coupling agents are described by the structural formulae [II] through [IV] that follow hereinafter.

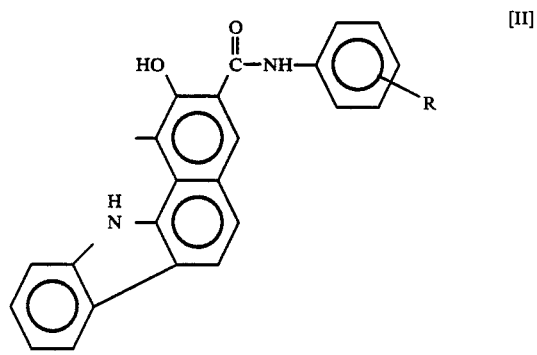
[II]

-continued

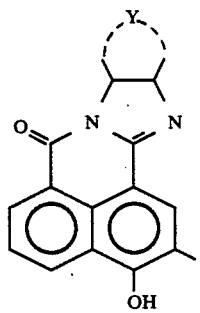
[III]

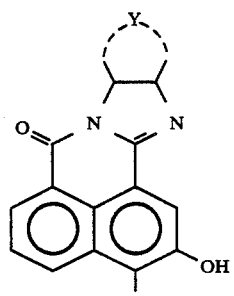
[IV]

In the aforesaid formulae, R and Y are the same as previously described.

A photosensitive member using bisazo compound in combination with the aforesaid specific diazo component and the coupling agents described in the previous formulae [II] through [IV] has improved chargeability particularly during repeated uses and also has excellent dispersion fluid stability, photo sensitivity and spectral sensitivity.

Examples of the preferred coupler, as described by the previously mentioned general formulae [II] through [IV], are given hereinafter, however, said coupler is not limited to those herein described.

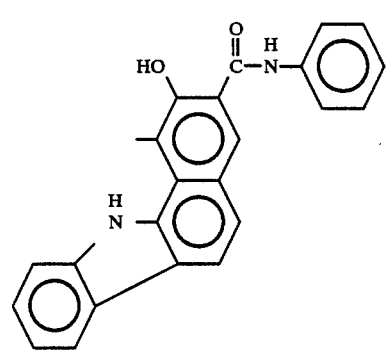
(1)

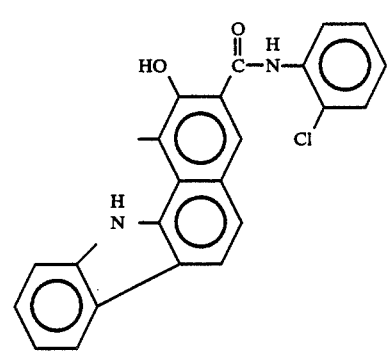
(2)

-continued

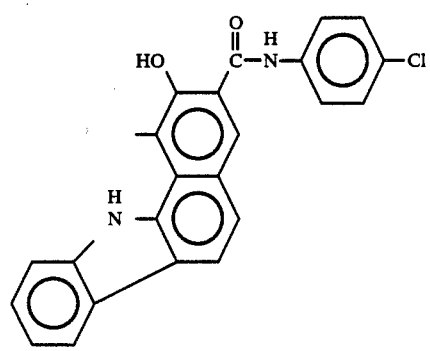
(3)

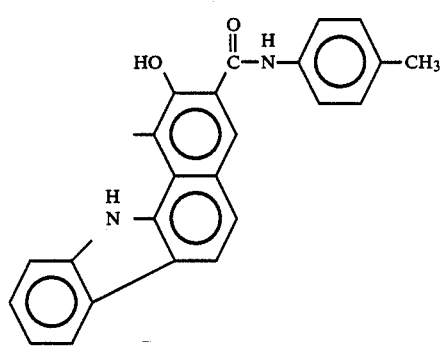
(4)

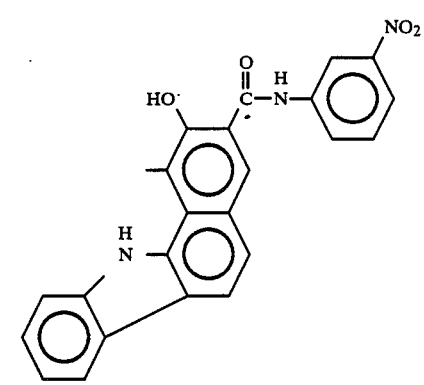
(5)

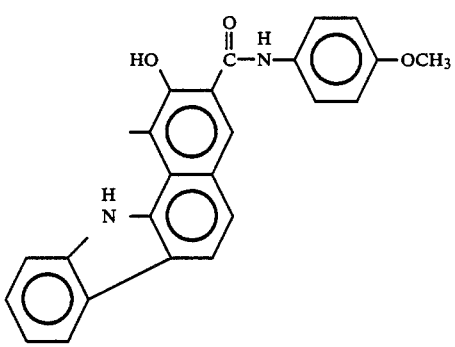
(6)

(7) 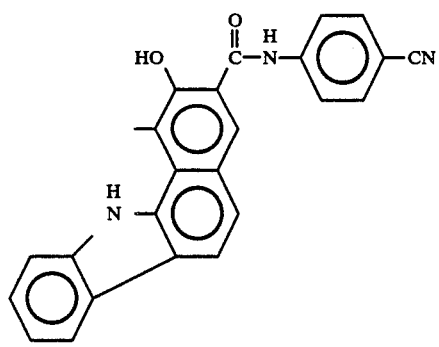
(8) 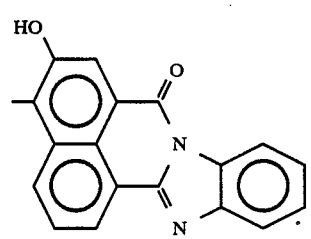
(9) 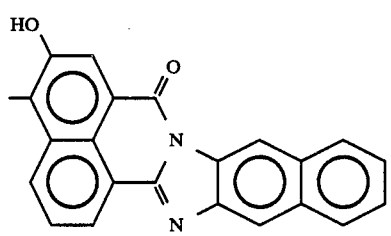
(10) 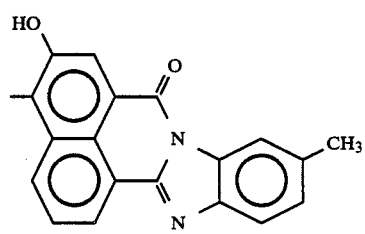
(11) 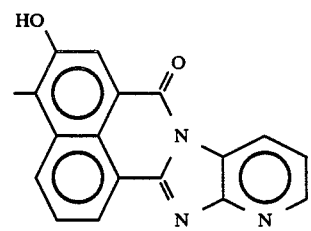
In addition, examples of the aforesaid diazo components which is used for forming the bisazo compound, as described by the previously mentioned general formula [I], are given hereinafter, however, said coupler is not limited to those herein described.
(a) 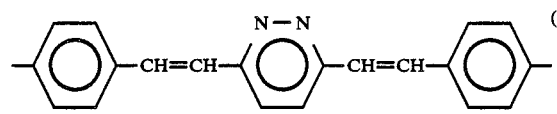
(b) 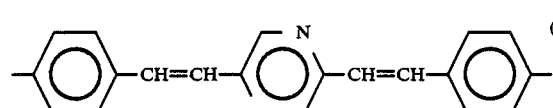
(c) 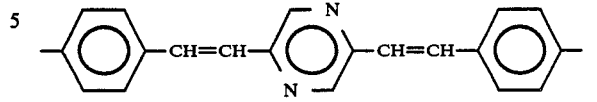
(d) 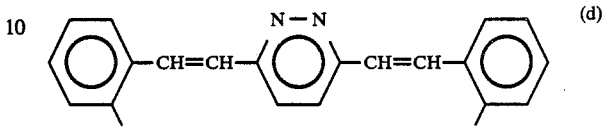
(e) 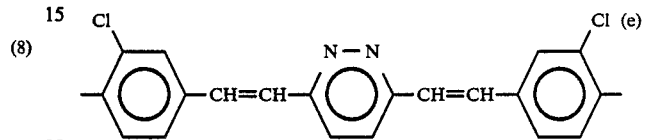
(f) 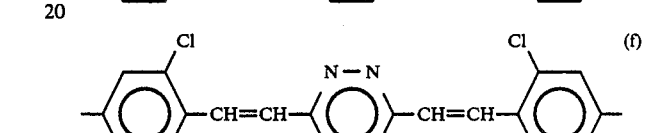
(g) 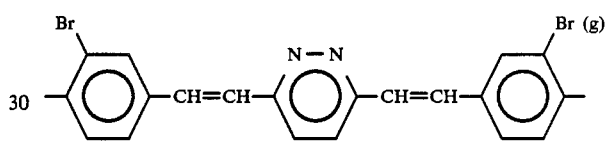
(h) 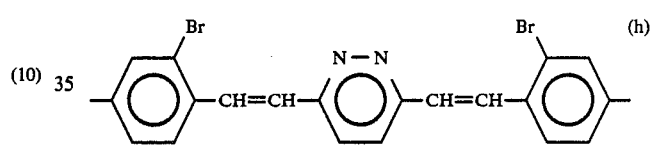
(i) 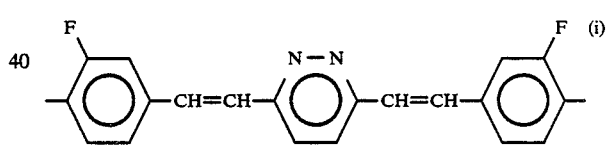
(j) 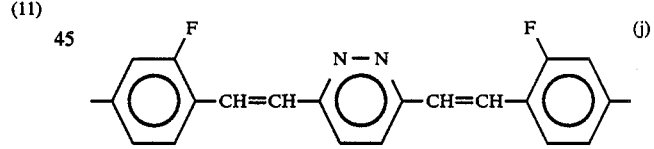
(k) 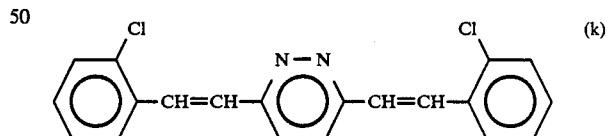
(l) 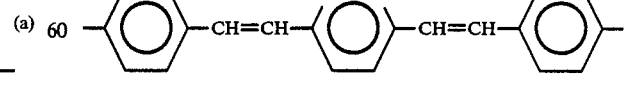
(m) 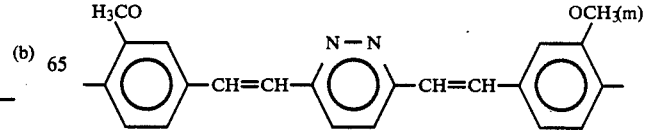

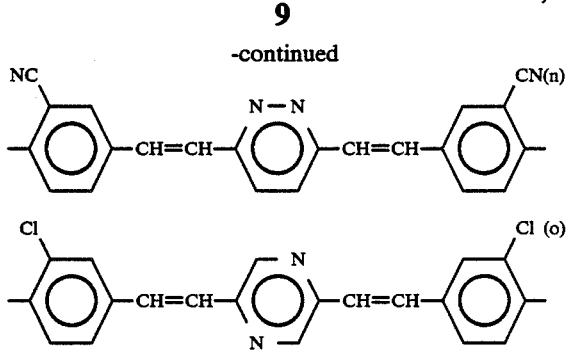

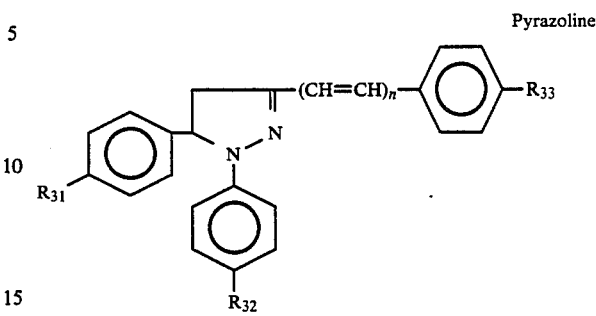

The photosensitive member of the present invention may be a dispersion type incorporating bisazo pigment in the photoconductive layer, said bisazo pigment being described by general formula [I], or an organic separation type wherein the charge generating layer and charge transporting layer are laminated and a pigment, as described by general formula [I], is incorporated in the aforesaid charge generating layer.

In the case of a dispersion type photosensitive member, the photosensitive member of the present invention can be produced by dissolving or dispersing a bisazo pigment, as described by general formula [I], in a resin bonding agent using a ball mill in a suitable solvent, and adding charge transporting material in accordance with requirements to obtain a fluid coating which can be applied to the conductive substrate by spinner application, blade application, dipping, or like application methods, and drying said coating so as to obtain a photoconductive layer having a typical thickness of 5 to 30 μm, and preferably a thickness of 6 to 20 μm.

The bisazo pigment of the present invention has excellent dispersibility in solvents. Therefore, improved pot-life and coating layer uniformity are readily obtrained effects.

Examples of usable dispersion solvents include aromatic solvents such as toluene and xylene, ether solvents such as tetrahydrofuran and dioxane, amide solvents such as N,N-dimethylformamide, ketone solvents such as cyclohexanone and methyl ethyl ketone, halogenated hydrocarbon solvents such as 1,2-dichloroethane and trichloroethane.

The bisazo pigment of the present invention is combined with a resin bonding agent in the photoconductive layer at a rate of 0.5 to 200% by weight, and preferably at a rate of 30 to 150% by weight. When pigment is incorporated at a rate less than 0.5% by weight, sufficient photosensitivity is not obtained, and at a rate greater than 200% by weight, poor chargeability, poor layer formability and like problems occur. The substances described hereinafter may be used as charge transporting materials.

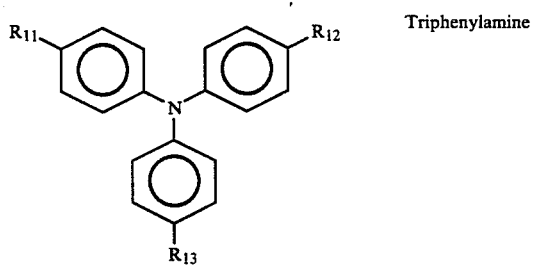

Triphenylamine (In the formula, R11, R12 and R13 are hydrogen atoms, alkyl radicals, alkoxy radicals, halogen atoms, hydroxy radicals, cyano radicals, dialkylamino radicals, diallylamino radicals or nitro radicals.)

Pyrazoline (In the formula, R31, R32 and R33 are hydrogen atoms, alkyl radicals, alkoxy radicals, halogen atoms, hydroxy radicals, cyano radicals, dialkylamino radicals, diallylamino radicals or nitro radicals; n is an integer of either 1 or 2).

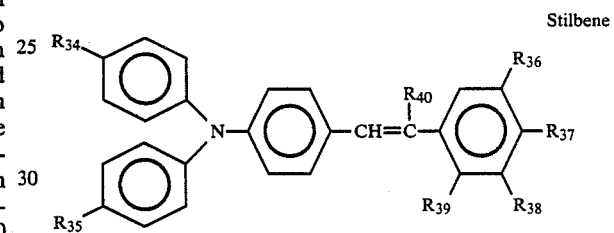

Stilbene (In the formula, R34, R35, R36, R37, R38 and R39 are hydrogen atoms, alkyl radicals, alkoxy radicals, halogen atoms, hydroxy radicals, cyano radicals, dialkylamino radicals, diallylamino radicals, diaralkylamino radicals or nitro radicals; R40 is either a hydrogen atom or phenyl radical.)

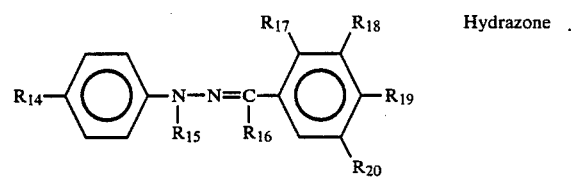

Hydrazone (In the formula, R14, R17, R18, R19 and R20 are hydrogen atoms, alkyl radicals, alkoxy radicals, halogen atoms, hydroxy radicals, cyano radicals, dialkylamino radicals, diallylamino radicals, diaralkylamino radicals or nitro radicals. R15 is an alkyl radical, or phenyl substitute radical. R16 is a hydrogen atom, alkyl radical, cyano radical, or phenyl substitute radical.)

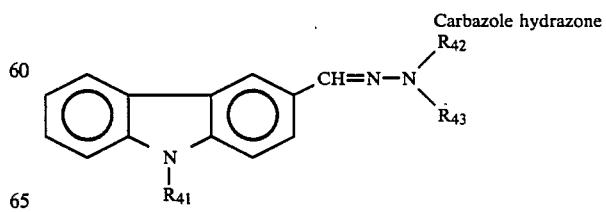

Carbazole hydrazone (In the formula, R41, R42 and R43 are substitute radicals of alkyl or an aromatic ring.)

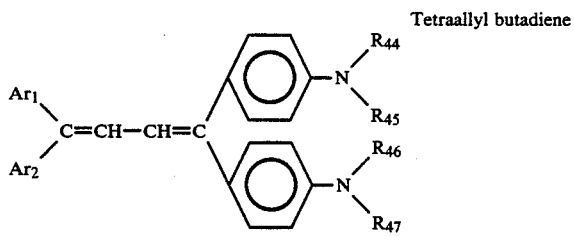

Tetraallyl butadiene (In the formula, Ar1 and Ar2 are aromatic hydrocarbon residues such as phenyl radicals, naphthyl radicals and the like; R44 to R47 are alkyl radicals such as methyl, ethyl and the like, allyl radicals such as phenyl, naphthyl and the like, or benzene.) The quantity of the aforesaid charge transporting materials, relative to the resin bonding agent in the photoconductive layer, is less than 280% by weight, and preferably 25 to 75% by weight.

In the present invention, desirable compounds are N-ethylcarbazole-3-carboaldehyde methylphenylhydrazone (MPH) given by the following structural formula:

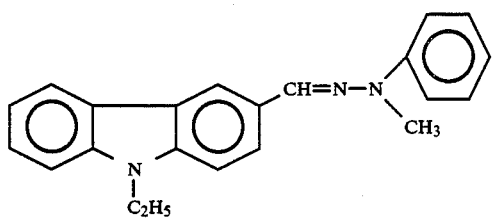

and 1,1-diphenyl-4,4-bis(diethylaminophenyl)-1,3-butadiene given by the following formula:

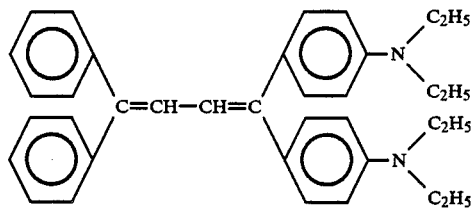

Optional compounds may be used when a bonding agent is used in the carrier generating layer or carrier transporting layer, but it is desirable to use a high polymer which is hydrophobic, has a high dielectric constant, and if formable in an electrically insulated film. Examples of the aforesaid type of high polymers are given hereinafter, however usuable substances are not limited to those specified herein. Examples of useful high polymers are, for example, polycarbonate, polyester, methacrylate resin, acrylic resin, polyvinyl chloride, polyvinylidene chloride, polystyrene, polyvinyl acetate, styrenebutadiene copolymerizate, vinylidene chloride-acrylonitrile copolymerizate, vinyl chloride-vinyl acetate copolymerizate, vinyl chloride-vinyl acetate-anhydrous maleic acid copolymerizate, silicone resin, silicone-alkyd resin, phenol-formaldehyde resin, styrene-alkyd resin, poly-N-vinylcarbazole, polyvinyl butyral, and polyvinyl formal.

The aforesaid bonding agents can be used in compounds of one, two, or more substances.

The aforesaid resins preferably have volume resistivity of $1 \times 10^{14}$ $\Omega$·cm or more when measured individually.

In the case of an organic separation type photosensitive member, the photosensitive member of the present invention can be produced by dispersing a bisazo pigment of the present invention can be produced by dispersing a bisazo pigment of the present invention in a bonding agent dissolved in solvent, thereby producing a fluid coating which is applied to a conductive substrate and dried so as to form a charge generating layer, then a charge transporting material and suitable bonding resin are dissolved in solvent to produce a fluid coating which is applied to the aforesaid charge generating layer and dried so as to form a charge transporting layer. At this time the thickness of the charge generating layer is 0.01 to 5 $\mu$m, and ideally 0.05 to 2 $\mu$m. The amount of bisazo pigment incorporated therein is 0.5 to 200% by weight relative to the bonding agent of the charge generating layer, and is ideally 30 to 150% by weight. Additionally, the thickness of the charge transporting layer is 2 to 100 $\mu$m, and ideally 10 to 30 $\mu$m. The amount of charge transporting material incorporated therein is 50 to 200% by weight relative to the bonding agent of the charge transporting layer, and is ideally 60 to 150% by weight. The charge transporting material and bonding agent may be the same materials as used for the dispersion type photosensitive member. Further, in organic separation type photosensitive members, the charge generating layer may be disposed on the surface, while the charge transporting layer may be disposed adjacent to the substrate, or their dispositions may be reversed.

Concrete examples of the synthesis of the bisazo pigment of the present invention are presented hereinafter.

BISAZO PIGMENT SYNTHESIS EXAMPLE 1

Bisazo pigment was synthesized by the method described hereinafter, wherein diazo component is labeled (a) and the coupler is designated (1).

First, 24 g of 3,6-dimethylpyridazine and 60 g of p-nitrobenzaldehyde were dissolved in 1 liter of acetic anhydride, then heated under reflux so as to obtain 33 g of 3,6-di(p-nitrostyryl)pyridazine.

Then, said dinitro product was reduced by a common method so as to produce 21 g of diamino compound.

Next, the aforesaid diamino product was first subjected to a diazo reaction by a common method, followed by a coupling reaction, so as to obtain 25 g of bisazo pigment.

The thus obtained bisazo pigment was a blackish-purple colored crystal having a decomposition point of over 300° C.

The starting material 3,6-dimethylpyridazine can be readily synthesized from the condensate of $\gamma$-di(ketone) and hydrazine in accordance with procedures described in the *Journal of the American Chemical Society*, 78, 1961 (1965).

BISAZO PIGMENT SYNTHESIS EXAMPLE 2

Bisazo pigment was synthesized by the method described hereinafter, wherein diazo component is labeled (b) and the coupler is designated (1).

First, 2,5-di(p-aminostyryl)-pyrazine was synthesized according to procedures described in *The Journal of Organic Chemistry*, p. 1603 (1958). The thus obtained amino product was subjected to diazo reaction by a standard method, and the tetrazonium salt was isolated as hydrofluoroboric acid salt. Five grams of said tetrazonium salt and 6.7 g of coupler (1) were dissolved in one liter of DMF, and sodium acetate aqueous solution (7 g/100 ml) was added to produce a coupling reaction. After agitating the solution for 2 hr, the derived crystal was removed by filtration, and washed three times in 5 liters DMF, three times in 5 liters of water and a further three times in 5 liters of THF. Thereafter, the remaining crystal was dried to obtain 4.8 g of bisazo pigment.

The thus obtained bisazo pigment had a decomposition point of over 300° C.

BISAZO PIGMENT SYNTHESIS EXAMPLE 3

Bisazo pigment was synthesized by the method described hereinafter, wherein diazo component is labeled (c) and the coupler is designated (1).

First, 2,5-di(p-nitrostyryl-pyrazine-N,N'-dioxide was synthesized by procedures described in *The Journal of Organic Chemistry*, p. 1603 (1958). By reducing the aforesaid compound under neutral of alkaline conditions, red crystals of 2,5-di(p-aminostyryl)-pyrazine-N-oxide were obtained which had a decomposition point of 264° C., and a mass spectrometric peak of 330 (calculated molecular weight: 330.4; $C_{20}H_{18}N_4O$).

The aforesaid amino product is subjectd to a diazo reaction by a standard method, and the tetrazomium salt was isolated as hydrofluoroboric acid salt.

Five grams of the obtained tetrazonium salt and 6.7 g of coupler (1) are dissolved in 1 liter of DMF, and sodium acetate aqueous solution (7 g/100 ml) is added to induce a coupling reaction. After agitation for 2 hr, the produced crystals were removed by filtration and washed three times in 5 liters of DMF, three times in 5 liters of water, and three times in 5 liters of TMF, and the remaining crystals are then dried to obtain 4.7 g of bisazo pigment.

The thus obtained bisazo pigment was a blackish-purple colored crystal having a decomposition point over 280° C.

BISAZO PIGMENT SYNTHESIS EXAMPLE 4

Bisazo pigment was synthesized by the method described hereinafter, wherein diazo component is labeled (d) and the coupler is designated (1).

First, 24 g of 3,6-dimethylpyridazine and 67 g of o-nitrobenzaldehyde were dissolved in 600 ml of propionic anhydride, then heated under reflux so as to obtain 33 g of 3,6-di(o-nitrostyryl)pyridazine.

Next, the aforesaid dinitro compound is reduced by a conventional method to produce 16 g of diamino material.

Then, the aforesaid diamino product was first subjected to a diazo reaction by a common method, followed by a coupling reaction, so as to obtain 19 g of bisazo pigment.

The thus obtained bisazo pigment was a blackish-purple colored crystal having a decomposition point of 240° C.

BISAZO PIGMENT SYNTHESIS EXAMPLE 5

Bisazo pigment was synthesized by the method described hereinafter, wherein diazo component is labeled (e) and the coupler is designated (1).

First, 28 g of 3,6-dimethylpyridazine and 98 g of 3-chloro-4-nitrobenzaldehyde were dissolved in 1.5 liters of acetic anhydride to produce 21 g of 3,6-di(3-chloro-4-nitrostyryl)-pyridazine.

Next, the aforesaid dinitro compound was reduced by a conventional method to produce 15 g of diamino compound.

Then, the aforesaid amino compound was first subjected to a diazo reaction by a conventional method, followed by a coupling reaction, so as to obtain 18 g of bisazo pigment.

The thus obtained bisazo pigment was a blackish-purple colored crystal having a decomposition point of over 290° C.

EXAMPLE 1

Two grams of bisazo compound comprising a diazo component (a) and a coupler (1) and 2 g of polyester resin (Bairon 200; manufactured by Toyobo Company, Ltd.) were added to 100 g of cyclohexanone and dispersed therein in a ball mill for 12 hr. The aforesaid dispersion was applied to a polyester film formed on an aluminum substrate by vapor deposition, thereby forming a layer having a thickness of 0.1 $\mu$m after drying so as to obtain a carrier generating layer. Next, 10 g of hydrazone compound (A) described hereinafter and 10 g of polycarbonate resin (K-1300; manufactured by Teijin Limited) were dissolved in 50 g of tetrahydrofuran, then the obtained solution was applied onto the aforesaid carrier generating layer and dried so as to form a carrier transporting layer having a thickness of 20 $\mu$m, and thereby obtain a photosensitive member of the present invention.

The aforesaid photosensitive member was charged to a surface potential of $-500$ V using a charger, and exposed to a halogen lamp to determine the half-life $E_{\frac{1}{2}}$ required to decay said surface potential by half.

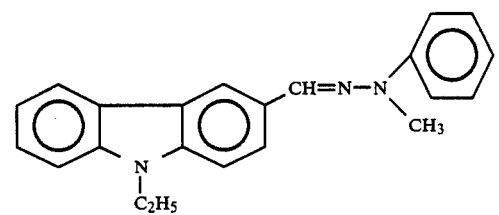

Hydrazone Compound (A)

Results of testing are shown in Table 1.

EXAMPLE 2

A photosensitive member of the present invention was produced in substantially the same manner as described in Example 1, with the exception that the bisazo compound used was as indicated in Table 1.

Results of testing are shown in Table 1.

EXAMPLES 3 AND 4

Photosensitive members of the present invention were produced in substantially the same manner as described in Example 1, with the exception that the bisazo compound used was as indicated in Table 1, and butadiene compound (B) described hereinafter was employed as the charge transporting material.

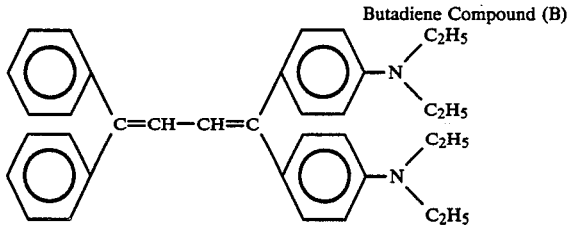

Butadiene Compound (B)

Results of testing were as described in Table 1.

EXAMPLES 5 AND 6

Photosensitive members were produced in substantially the same manner as described in Example 1, with the exception that the charge transporting material described in Table 1 was used, and couplers (20) and (21) described hereinafter were used.

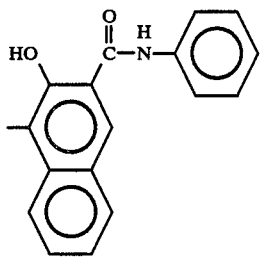

Coupler (20)

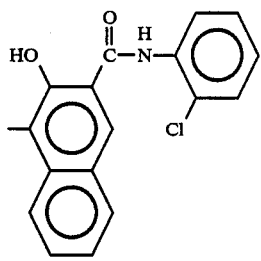

Coupler (21)

Results of testing are described in Table 1.

EXAMPLES 7 AND 8

Photosensitive members of the present invention were produced in substantially the same manner as described in Example 1, with the exception that the bisazo compounds described in Table 1 were used, and hydrazone compound (C) described hereinafter was employed as the charge transporting material.

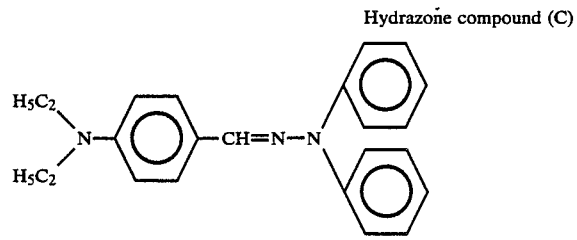

Hydrazone compound (C)

EXAMPLES 9 TO 42

Photosensitive member of the present invention were produced in substantially the same manner as described in Example 1, with the exception that bisazo compounds and charge transporting materials were as indicated in Table 1.

Results of testing are described in Table 1.

TABLE 1

| | Diazo component | Coupler | Charge transporting material | $E_\frac{1}{2}$ (lux.s) |
|---|---|---|---|---|
| Example 1 | a | 1 | A | 2.1 |
| Example 2 | a | 8 | A | 1.9 |
| Example 3 | a | 1 | B | 0.9 |
| Example 4 | a | 8 | B | 1.7 |
| Example 5 | a | 20 | B | 2.6 |
| Example 6 | a | 21 | B | 2.5 |
| Example 7 | b | 1 | C | 4.0 |
| Example 8 | b | 8 | C | 6.5 |
| Example 9 | b | 1 | A | 5.6 |
| Example 10 | b | 8 | A | 8.0 |
| Example 11 | c | 1 | A | 5.2 |
| Example 12 | c | 2 | A | 5.1 |
| Example 13 | c | 8 | A | 3.3 |
| Example 14 | c | 1 | B | 5.5 |
| Example 15 | c | 2 | B | 5.4 |
| Example 16 | c | 8 | B | 3.5 |
| Example 17 | c | 20 | B | 2.1 |
| Example 18 | c | 21 | B | 2.1 |
| Example 19 | d | 1 | A | 9.0 |
| Example 20 | d | 2 | A | 7.9 |
| Example 21 | d | 8 | A | 8.7 |
| Example 22 | d | 1 | B | 5.1 |
| Example 23 | d | 2 | B | 5.0 |
| Example 24 | d | 8 | B | 7.9 |
| Example 25 | d | 20 | A | 15.0 |
| Example 26 | d | 21 | A | 12.0 |
| Example 27 | e | 1 | A | 5.7 |
| Example 28 | e | 2 | A | 4.3 |
| Example 29 | e | 8 | A | 5.8 |
| Example 30 | e | 1 | B | 2.7 |
| Example 31 | e | 2 | B | 2.5 |
| Example 32 | e | 8 | B | 5.8 |
| Example 33 | e | 20 | B | 3.5 |
| Example 34 | e | 21 | B | 3.2 |
| Example 35 | f | 1 | A | 8.1 |
| Example 36 | f | 2 | A | 7.9 |
| Example 37 | f | 8 | A | 5.0 |
| Example 38 | f | 1 | B | 3.2 |
| Example 39 | f | 2 | B | 2.9 |
| Example 40 | f | 8 | B | 3.6 |
| Example 41 | f | 20 | B | 4.0 |
| Example 42 | f | 21 | B | 3.6 |

EXAMPLES 43 TO 66

Photosensitive members were produced in substantially the same manner as described in Example 1, with the exception that the bisazo compounds and charge transporting materials described in Table 2 were used.

TABLE 2

| | Diazo component | Coupler | Charge transporting material |
|---|---|---|---|
| Example 43 | g | 1 | A |
| Example 44 | g | 2 | A |
| Example 45 | g | 8 | A |
| Example 46 | g | 1 | B |
| Example 47 | g | 2 | B |
| Example 48 | g | 8 | B |
| Example 49 | g | 20 | B |
| Example 50 | g | 21 | B |
| Example 51 | i | 1 | A |
| Example 52 | i | 2 | A |
| Example 53 | i | 8 | A |
| Example 54 | i | 1 | B |
| Example 55 | i | 2 | B |
| Example 56 | i | 8 | B |
| Example 57 | i | 20 | B |
| Example 58 | i | 21 | B |
| Example 59 | j | 1 | A |
| Example 60 | j | 2 | A |

TABLE 2-continued

| | Diazo component | Coupler | Charge transporting material |
|---|---|---|---|
| Example 61 | j | 8 | A |
| Example 62 | j | 1 | B |
| Example 63 | j | 2 | B |
| Example 64 | j | 8 | B |
| Example 65 | j | 20 | A |
| Example 66 | j | 21 | A |

Photosensitive members produced in Examples 1 through 50 and Comparative Examples 1 through 16 were charged with a corona charger ($I_t = -500$ μA) and initial surface potentials ($V_o$) were measured. The photosensitive members were then exposed at 200 lux.s and recharged by a corona charger ($I_t = -500$ μA) and the subsequent surface potential ($V_o'$) was determined. Measurement results are shown in Table 3.

TABLE 3

| | Initial surface potential Vo | Surface potential Vo' | Vo down \|Vo − Vo'\| |
|---|---|---|---|
| Example 1 | −620 | −600 | 20 |
| Example 2 | −600 | −580 | 20 |
| Example 3 | −610 | −600 | 10 |
| Example 4 | −600 | −580 | 20 |
| Example 5 | −560 | −45 | 515 |
| Example 6 | −580 | −40 | 540 |
| Example 7 | −680 | −670 | 10 |
| Example 8 | −660 | −630 | 30 |
| Example 9 | −700 | −690 | 10 |
| Example 10 | −680 | −670 | 10 |
| Example 11 | −500 | −500 | 0 |
| Example 12 | −490 | −490 | 0 |
| Example 13 | −510 | −500 | 10 |
| Example 14 | −530 | −520 | 10 |
| Example 15 | −520 | −520 | 0 |
| Example 16 | −480 | −470 | 10 |
| Example 17 | −500 | −200 | 300 |
| Example 18 | −510 | −150 | 360 |
| Example 19 | −650 | −650 | 0 |
| Example 20 | −630 | −630 | 0 |
| Example 21 | −500 | −490 | 10 |
| Example 22 | −600 | −580 | 20 |
| Example 23 | −630 | −630 | 0 |
| Example 24 | −500 | −480 | 20 |
| Example 25 | −690 | −300 | 390 |
| Example 26 | −700 | −400 | 300 |
| Example 27 | −700 | −700 | 0 |
| Example 28 | −690 | −690 | 0 |
| Example 29 | −250 | −200 | 50 |
| Example 30 | −600 | −590 | 10 |
| Example 31 | −650 | −650 | 0 |
| Example 32 | −380 | −350 | 30 |
| Example 33 | −580 | −55 | 525 |
| Example 34 | −550 | −45 | 505 |
| Example 35 | −650 | −630 | 20 |
| Example 36 | −660 | −630 | 30 |
| Example 37 | −500 | −490 | 10 |
| Example 38 | −580 | −580 | 0 |
| Example 39 | −600 | −600 | 0 |
| Example 40 | −490 | −450 | 40 |
| Example 41 | −540 | −40 | 500 |
| Example 42 | −520 | −40 | 480 |
| Example 43 | −600 | −580 | 20 |
| Example 44 | −590 | −580 | 10 |
| Example 45 | −200 | −180 | 20 |
| Example 46 | −590 | −580 | 10 |
| Example 47 | −570 | −560 | 10 |
| Example 48 | −220 | −200 | 20 |
| Example 49 | −550 | −310 | 240 |
| Example 50 | −580 | −360 | 220 |
| Example 51 | −670 | −660 | 10 |
| Example 52 | −680 | −680 | 0 |
| Example 53 | −520 | −490 | 30 |
| Example 54 | −600 | −580 | 20 |
| Example 55 | −610 | −610 | 0 |

TABLE 3-continued

| | Initial surface potential Vo | Surface potential Vo' | Vo down \|Vo − Vo'\| |
|---|---|---|---|
| Example 56 | −400 | −360 | 40 |
| Example 57 | −640 | −310 | 330 |
| Example 58 | −620 | −290 | 330 |
| Example 59 | −660 | −660 | 0 |
| Example 60 | −710 | −700 | 10 |
| Example 61 | −580 | −570 | 10 |
| Example 62 | −670 | −660 | 10 |
| Example 63 | −680 | −680 | 0 |
| Example 64 | −530 | −500 | 30 |
| Example 65 | −690 | −430 | 260 |
| Example 66 | −720 | −390 | 330 |

As shown in Tables 1 and 3, the photosensitive member of the present invention possesses excellent electrophotographic characteristics, and the photosensitive member using bisazo compound in combination with the aforesaid specific diazo component and the coupling agents described in the structural formulae [II] through [IV] possesses chargeability during repeated use in particularly superior.

What is claimed is:

1. A photosensitive member comprising a photoconductive layer incorporating a bisazo compound described by general structural formula [I] and formed on an electrically conductive substrate;

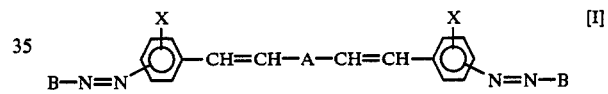

Wherein X is a hydrogen atom, halogen atom, alkyl radical, alkoxi radical, nitro radical or cyano radical; A is a diatomic radical selected from among the following:

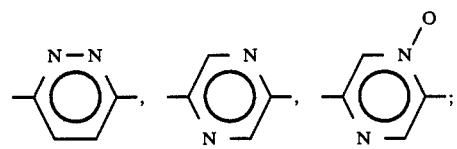

B is a coupler described by formulae [II] through [IV];

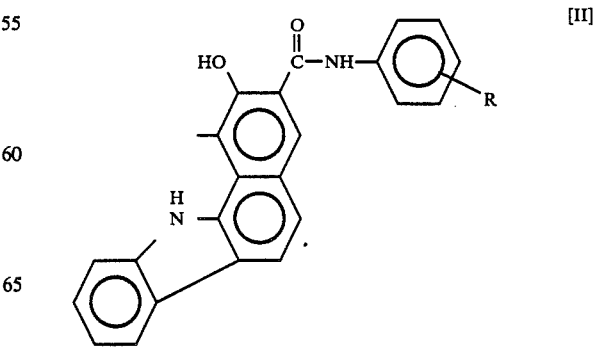

-continued

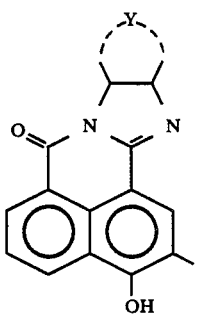 [III]

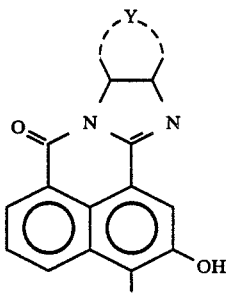 [IV]

R is a hydrogen atom, halogen atom, alkyl radical, alkoxi radical, nitro radical or cyano radical; and Y is an aromatic carbocyclic residue or aromatic heterocyclic residue, each of which may have a substituent.

2. A photosensitive member comprising a charge generating layer and a charge transporting layer formed on an electrically conductive substrate, wherein the charge generating layer comprises a bisazo compound described by general structural formula [I];

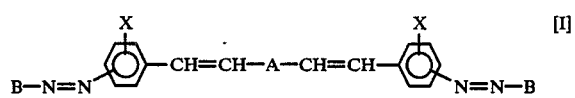 [I]

Wherein X is a hydrogen atom, halogen atom, alkyl radical, alkoxi radical, nitro radical or cyano radical; A is a diatomic radical selected from among the following:

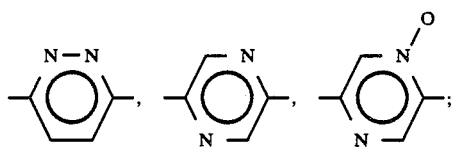

B is a coupler described by formulae [II] through [IV];

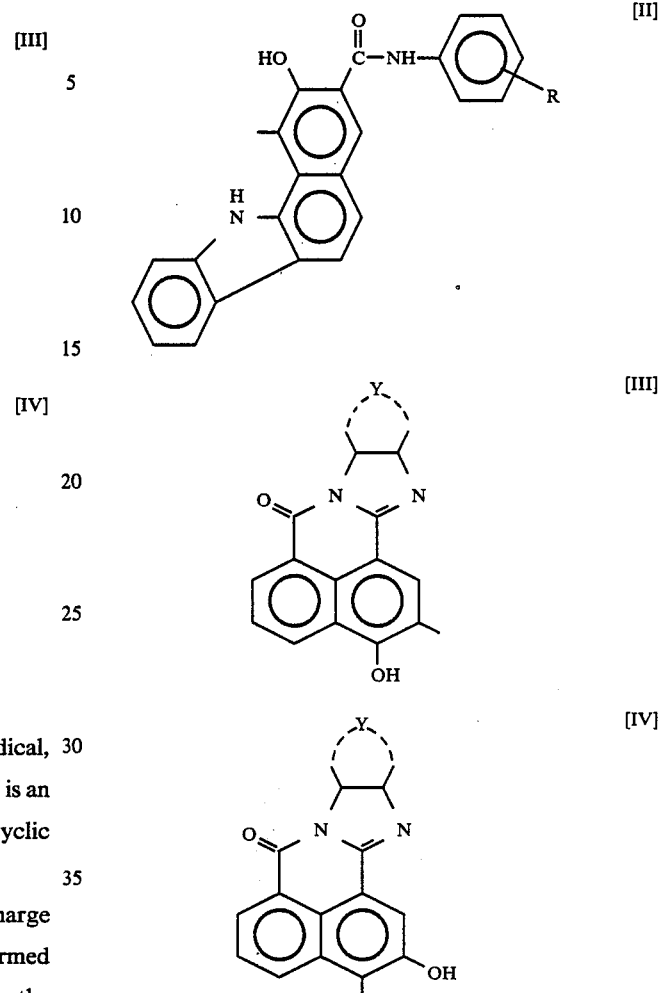

R is a hydrogen atom, halogen atom, alkyl radical, alkoxi radical, nitro radical or cyano radical; and Y is an aromatic carbocyclic residue or aromatic heterocyclic residue, each of which may have a substituent.

3. A photosensitive member of claim 2, wherein the thickness of the charge generating layer is 0.01 to 5 μm.

4. A photosensitive member of claim 2, wherein the thickness of the charge transporting layer is 2 to 100 μm.

5. A photosensitive member of claim 2, wherein the charge generating layer contains the bisazo compound dispersed in a binder resin.

6. A photosensitive member of claim 5, wherein the amount of said bisazo compound is 0.5 to 200% by weight relative to the binder resin.

7. A photosensitive member of claim 2, wherein the charge transporting layer contains a charge transporting material dispersed in a binder resin.

8. A photosensitive member of claim 7, wherein the amount of the charge transporting material is 50 to 200% by weight relative to the binder resin.

9. A photosensitive member with a photosensitive layer formed by dispersing a charge generating material and a charge transporting material in a binder resin on an electrically substrate, wherein the charge generating material is a bisazo compound described by general structural formula [I];

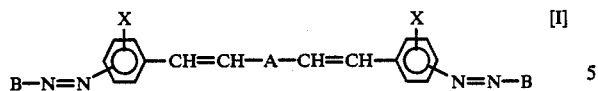 [I]

Wherein X is a hydrogen atom, halogen atom, alkyl radical, alkoxi radical, nitro radical or cyano radical; A is a diatomic radical selected from among the following:

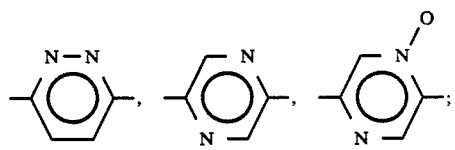

B is a coupler described by formulae [II] through [IV];

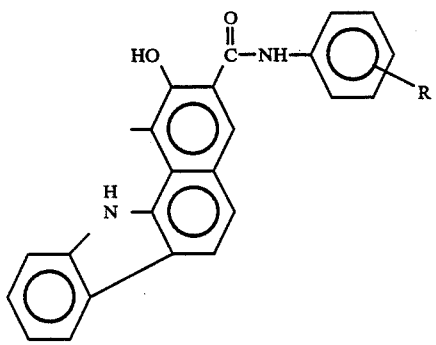 [II]

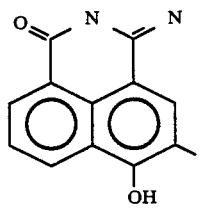 [III]

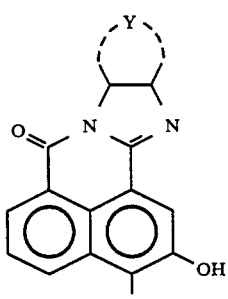 [IV]

R is a hydrogen atom, halogen atom, alkyl radical, alkoxi radical, nitro radical or cyano radical; and Y is an aromatic carbocyclic residue or aromatic heterocyclic residue, each of which may have a substituent.

10. A photosensitive member of claim 9, wherein the thickness of the photosensitive layer is 5 to 30 μm.

11. A photosensitive member of claim 9, wherein the amount of said bisazo compound is 0.5 to 200% by weight relative to the binder resin.

12. A photosensitive member of claim 9, wherein the amount of the charge transporting material is 280% by weight or less relative to the binder resin.

* * * * *